No. 773,513. PATENTED OCT. 25, 1904.
C. R. MOON.
BOLT POINTING AND THREADING MACHINE.
APPLICATION FILED JUNE 29, 1903.
NO MODEL. 12 SHEETS—SHEET 1.

Fig. 1.

Witnesses
Frank A. Fahle
J. A. Walsh

Inventor
Charles R. Moon
by Bradford & Hood,
Attorneys

No. 773,513. PATENTED OCT. 25, 1904.
C. R. MOON.
BOLT POINTING AND THREADING MACHINE.
APPLICATION FILED JUNE 29, 1903.
NO MODEL. 12 SHEETS—SHEET 2.

Fig. 2.

Witnesses
Frank A. Sahle
J. A. Walsh.

Inventor
Charles R. Moon
by Bradford & Hood,
Attorneys

No. 773,513. PATENTED OCT. 25, 1904.
C. R. MOON.
BOLT POINTING AND THREADING MACHINE.
APPLICATION FILED JUNE 29, 1903.
NO MODEL. 12 SHEETS—SHEET 3.

Witnesses
Frank A. Fahle
J. A. Walsh

Inventor
Charles R. Moon
by
Bradford & Hood,
Attorneys

No. 773,513. PATENTED OCT. 25, 1904.
C. R. MOON.
BOLT POINTING AND THREADING MACHINE.
APPLICATION FILED JUNE 29, 1903.
NO MODEL. 12 SHEETS—SHEET 4.

Fig. 5.

Witnesses
Frank A. Fahle
J. A. Walsh

Inventor
Charles R. Moon
by
Bradford & Hood,
Attorneys

No. 773,513. PATENTED OCT. 25, 1904.
C. R. MOON.
BOLT POINTING AND THREADING MACHINE.
APPLICATION FILED JUNE 29, 1903.
NO MODEL. 12 SHEETS—SHEET 5.

Inventor
Charles R. Moon

Witnesses

No. 773,513. PATENTED OCT. 25, 1904.
C. R. MOON.
BOLT POINTING AND THREADING MACHINE.
APPLICATION FILED JUNE 29, 1903.
NO MODEL. 12 SHEETS—SHEET 6.

Witnesses
Inventor
Charles R. Moon
by

Attorneys

No. 773,513. PATENTED OCT. 25, 1904.
C. R. MOON.
BOLT POINTING AND THREADING MACHINE.
APPLICATION FILED JUNE 29, 1903.
NO MODEL. 12 SHEETS—SHEET 8.

Inventor
Charles R. Moon

No. 773,513. PATENTED OCT. 25, 1904.
C. R. MOON.
BOLT POINTING AND THREADING MACHINE.
APPLICATION FILED JUNE 29, 1903.
NO MODEL. 12 SHEETS—SHEET 9.

Witnesses
Frank A. Fahle
J. A. Walsh

Inventor
Charles R. Moon
by
Bradford & Hood,
Attorneys

No. 773,513. PATENTED OCT. 25, 1904.
C. R. MOON.
BOLT POINTING AND THREADING MACHINE.
APPLICATION FILED JUNE 29, 1903.
NO MODEL. 12 SHEETS—SHEET 10.

Witnesses
Frank A. Fahle
J. A. Walsh

Inventor
Charles R. Moon
by
Bradford & Hood,
Attorneys

No. 773,513. PATENTED OCT. 25, 1904.
C. R. MOON.
BOLT POINTING AND THREADING MACHINE.
APPLICATION FILED JUNE 29, 1903.
NO MODEL. 12 SHEETS—SHEET 11.

Fig. 27.

Witnesses
Frank A. Fahle
J. A. Walsh.

Inventor
Charles R. Moon
by Bradford & Hood,
Attorneys

No. 773,513. Patented October 25, 1904.

UNITED STATES PATENT OFFICE.

CHARLES R. MOON, OF MUNCIE, INDIANA.

BOLT POINTING AND THREADING MACHINE.

SPECIFICATION forming part of Letters Patent No. 773,513, dated October 25, 1904.

Application filed June 29, 1903. Serial No. 163,929. (No model.)

*To all whom it may concern:*

Be it known that I, CHARLES R. MOON, a citizen of the United States, residing at Muncie, in the county of Delaware and State of Indiana, have invented certain new and useful Improvements in Bolt Pointing and Threading Machines, of which the following is a specification.

The object of my invention is to produce a machine capable of receiving in a suitable hopper a large number of unthreaded bolts and advancing said bolts successively into coaction with mechanism by which they are automatically transferred (one by one) from said hopper to a holding apparatus, then to means for pointing the end of the bolt, then to threading means, and from thence automatically discharged.

Referring to the accompanying drawings, which are made a part hereof, and on which similar reference characters indicate similar parts.

In the drawings the driving-shaft 40 carries a gear 41, which through a train of gears 42 drives a gear 43, loosely mounted upon a main shaft 44. Attached to shaft 44 is a clutch-disk 45, in which is pivoted a clutch-arm 46, which extends out beyond the disk and which also carries a finger 47, which projects into an annular groove 48, formed in the adjacent face of the gear 43, so that under normal conditions if the finger 46 is not interfered with it will by reason of its weight (alone or aided by spring *s*) move disk 45 around sufficiently to cause finger 47 to impinge within the groove 48, and thus lock clutch-gear 43 to shaft 44 and cause it to rotate.

Figures 6, 7, 8, 9:
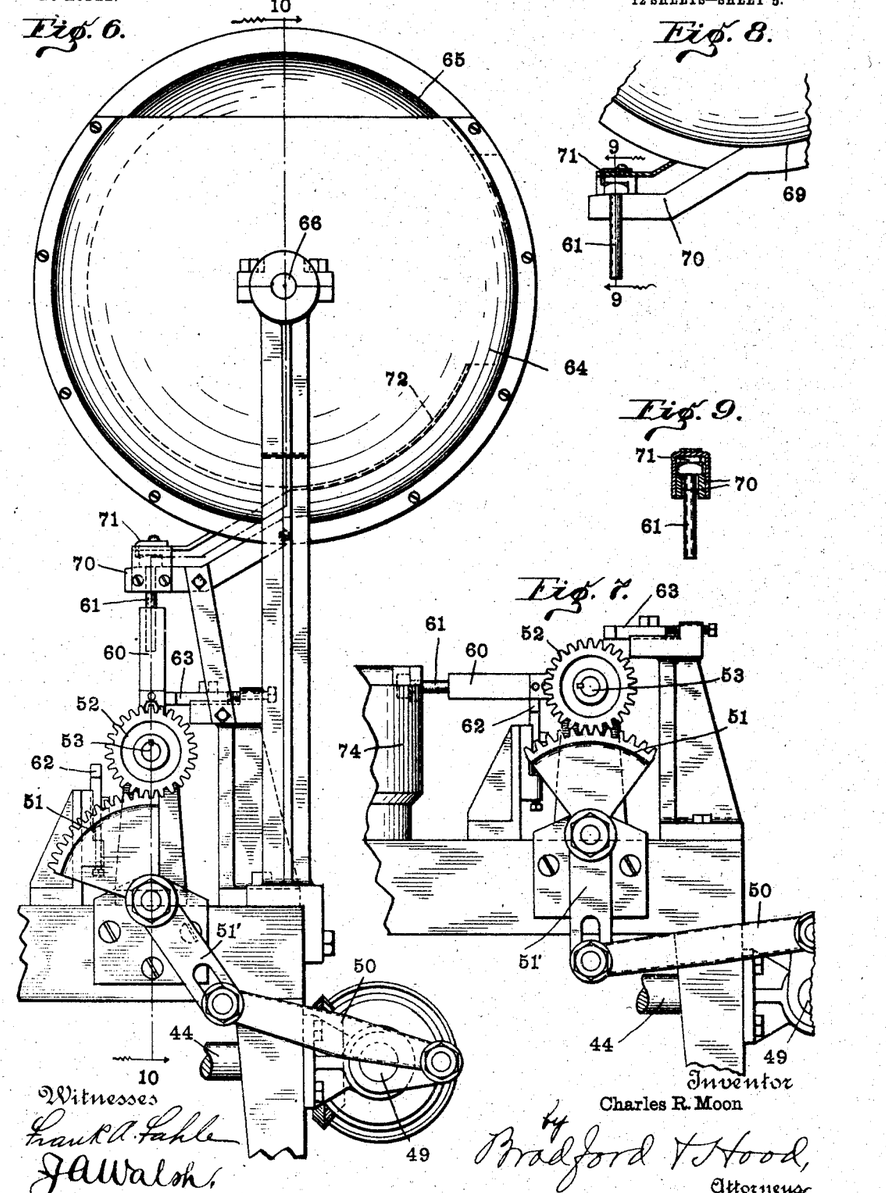
Fig. 6, a side elevation thereof of the side opposite to that shown in Fig. 1 as seen from the dotted line 6 6 alongside Fig. 5, the transferring means being shown in receiving position.
Fig. 7, a similar view of the transferring means in its discharging position.
Fig. 8, a detail section of the discharge-spout of the hopper.
Fig. 9, a section on line 9 9 of Fig. 8.
Figures 10, 11:
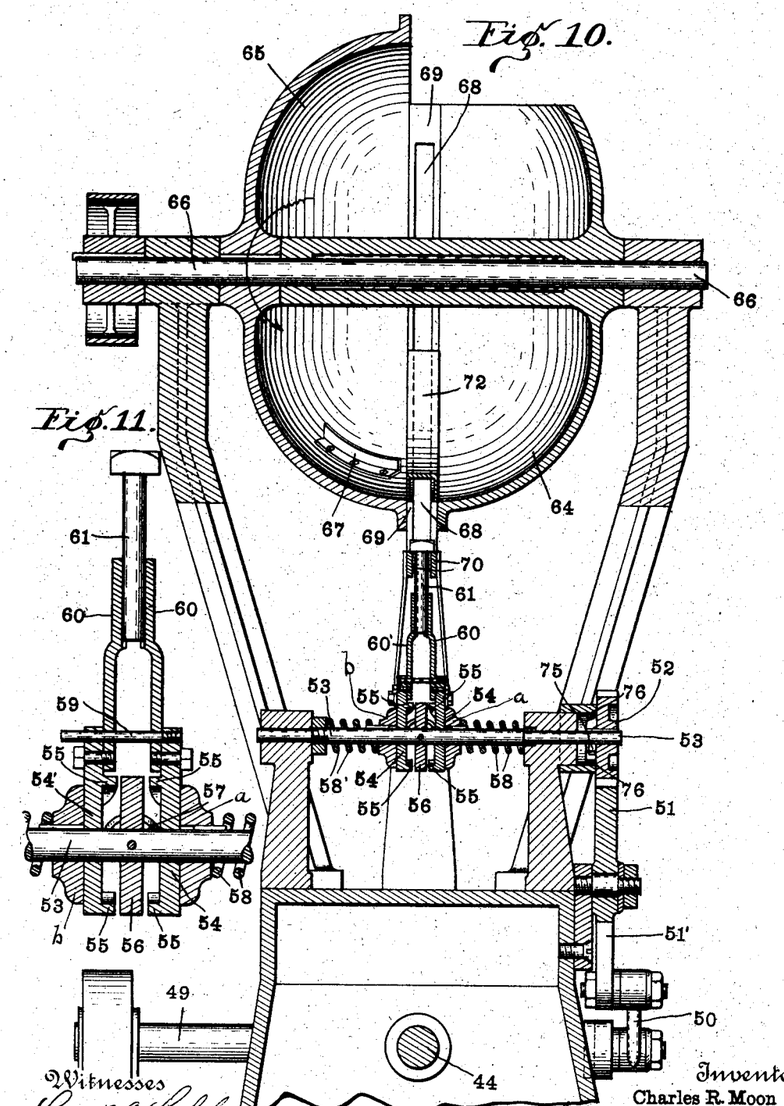
Fig. 10, a section on line 10 10 of Fig. 6.
Fig. 11, an enlarged sectional detail of the bolt-gripping fingers shown in smaller section in Fig. 10.

The rotation of shaft 44 causes rotation of shaft 49, which in the train through pitman 50, segment 51, including crank-arm 51', and gear 52, will rock the rock-shaft 53. Loosely mounted upon shaft 53 are two disks 54 and 54', which are provided upon their adjacent faces with cams 55, and between these cams and fastened to said shaft lies a cam-plate 56, having cams 57. The disks 54 and 54' are normally urged toward cam-disk 56 by means of springs 58 and 58', and when rock-shaft 53 is moved the disks 54 and 54' will move with the shaft under normal conditions. The two disks 54 and 54' are held against relative rotation by means of pins 59, which are carried by one disk and project through the other. Secured to the disks 54 and 54' are two bolt-gripping fingers 60 and 60', respectively, the inner faces of which are provided with sockets between which the unthreaded bolt 61 may be received. When the bolt-gripping fingers 60 and 60' are thrown down to the position shown in Fig. 7, they come into engagement with an adjustable stop 62 and are held against further rotation while the shaft 53 continues in its movement until the cams 57 are brought into engagement with the cams 55, thus operating to spread the disks 54 and 54' and with them the two fingers 60 60'. The return movement of rock-shaft 53 brings fingers 60 and 60' upward to the position shown in Fig. 6, the pressure of the springs 58 58' serving to hold the cams 55 in engagement with the cams 57 until the fingers 60 60' have been brought into engagement with an adjustable stop 63, at which time the fingers are opposite a bolt 61, which hangs in delivering position from the hopper. Thereupon a slight continued rotation of shaft 53 withdraws cams 57 from between cams 55, and thus allows fingers 60 60' to spring together and grip the bolt between them, as shown in Figs. 6, 10, and 11. I prefer to provide friction-plates $a$ and $b$, against which the ends of the springs 58 and 58' shall immediately rest, and to spline them upon the shaft 53, as tending to improve the character of the desired frictional contact.

Figure 5:
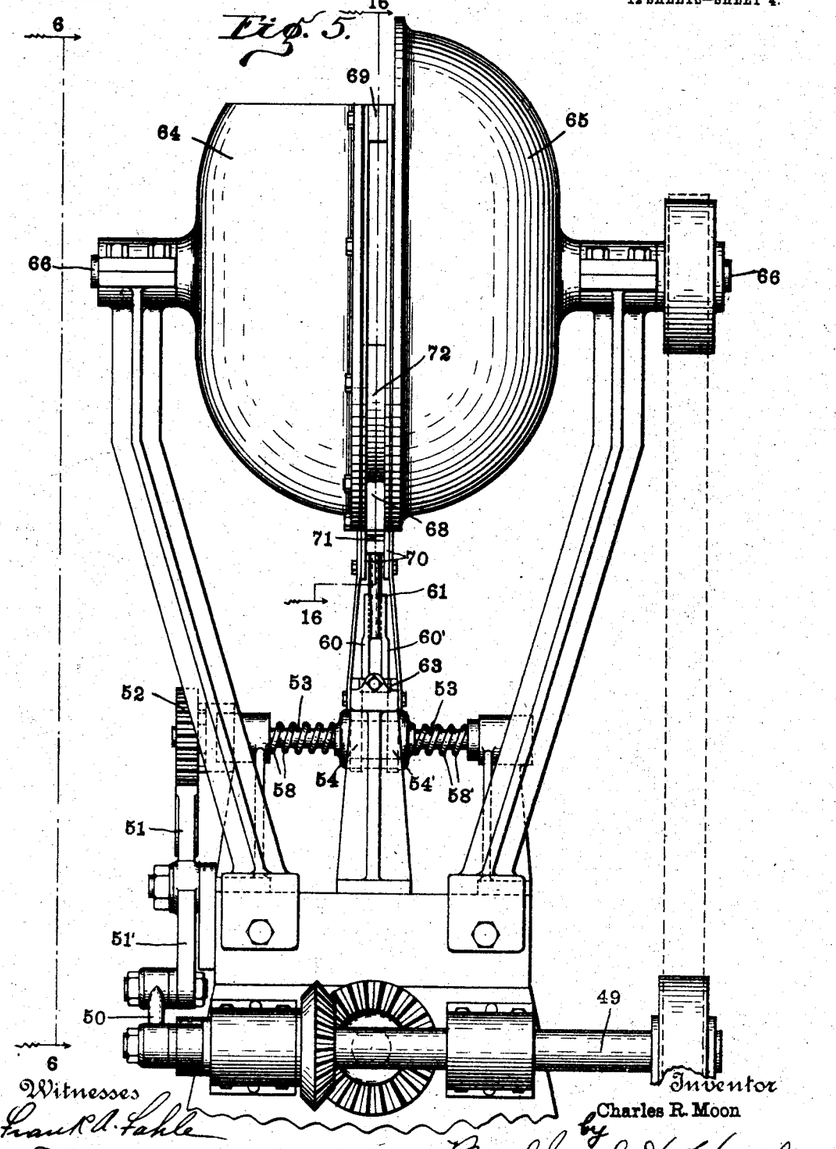
Fig. 5, an end elevation, on a considerably larger scale, of the feeding-hopper and automatic transferring means as seen from the dotted line 5 5 alongside Fig. 1.

The bolts 61 are delivered from a hopper which consists of a stationary section 64 and a rotating cup-shaped section 65, which is continuously rotated by means of a shaft 66, belted to shaft 49, as indicated in Fig. 5. The interior of section 55 is provided with one or more inwardly-projecting flanges 67, which serve to continually raise one or more bolts and bring them upward to a point where they may fall (unthreaded end outward) through a slot 68, which is formed in a track portion 69, lying between the two sections of the hopper. The lower portion of this track member 69 ends in a supporting-finger 70, Fig. 8, which is adapted to support a bolt 61 in position to be grasped by the fingers 60 61', these bolts being yieldingly held in position by means of a spring-finger 71. The lower portion of track 69 is protected by means of an inverted-U-shaped guard 72, and the slot 69 is of such width as to permit the passage of the unthreaded end of the bolts therethrough, but too narrow to permit the heads of the bolts to pass through. The feeding-hopper described above forms the subject-matter of my pending application Serial No. 165,348.

Figure 12:
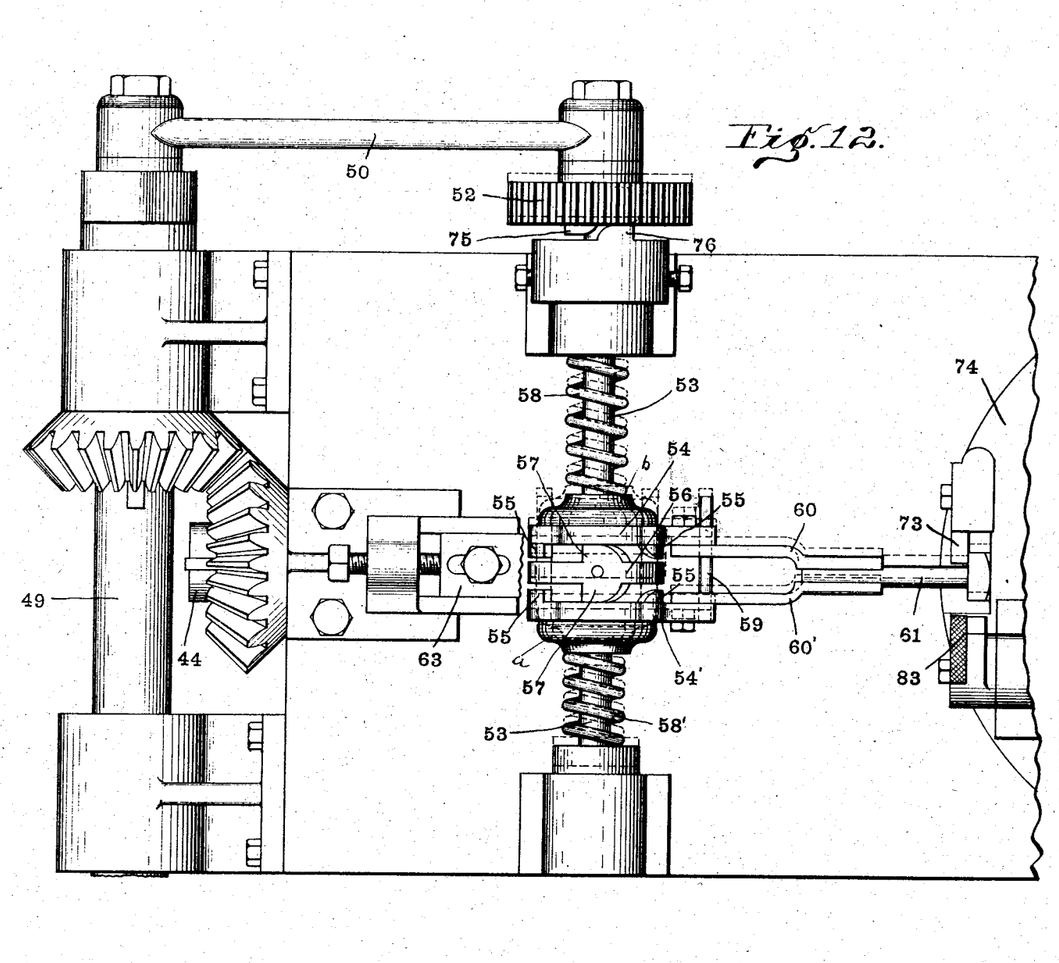
Fig. 12 is a plan looking downwardly from the dotted line 12 12 in Fig. 1, on a considerably larger scale, of the parts shown in Fig. 7, the gripping-fingers being shown in position immediately prior to discharging position.
Figure 13:
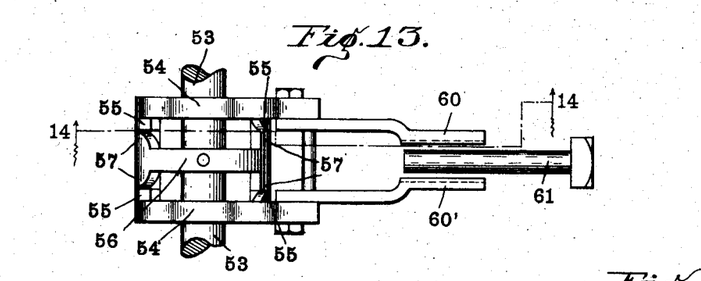
Fig. 13, a plan of the gripping-fingers in discharging position, the guiding-rods between the fingers being omitted for the sake of clearness.
Figures 14, 15, 16, 17:
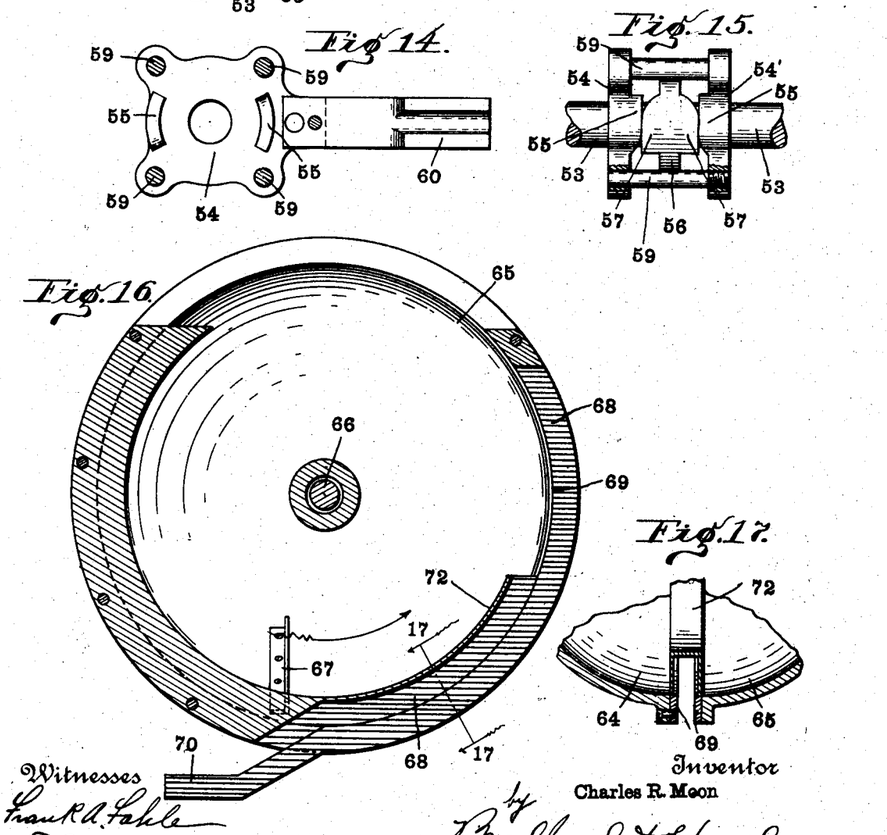
Fig. 14, a section on the line 14 14 of Fig. 13.
Fig. 15, an end elevation, partially in section, of the parts shown in Fig. 13.
Fig. 16, a central vertical section of the feed-hopper looking as indicated by dotted lines 16 16 in Fig. 5 in the direction opposite to that of the direction of sight of the section shown in Fig. 2.
Fig. 17, a section on line 17 17 of Fig. 16.

When a bolt has been grasped between the fingers 60 60', a return oscillation of rock-shaft 53 throws said fingers down to the position shown in Fig. 7 and in full lines in Fig. 12, and in this position the shank of the bolt just misses one of the stationary jaws 73 of one of the sets of bolt-holding jaws of the turret 74. Thereupon a cam 75, carried by gear 52, comes into engagement with a stationary cam 76, and thus causes shaft 53, together with all its parts, to be shifted to the position shown in dotted lines in Fig. 12, the shank of the bolt being thus introduced into the notch of jaw 73, (see Fig. 19,) while the head of the bolt lies behind said jaw. Just at the time the parts have been moved to the position shown in dotted lines in Fig. 12 the fingers 60 60' come into engagement with the adjustable stop 62, and a slight continued movement of shaft 53 results in a movement of cams 57 in between cams 55, so as to spread fingers 60 60' and release the bolt. Immediately prior to this time the cam 77, which lies centrally above the turret 74, is shifted slightly in the direction indicated by the arrow in Fig. 18, this movement being accomplished by means of an arm 78, which engages an arm 79, carried by the shaft 80, to the upper end of which cam 77 is attached. This slight movement of cam 77 withdraws said cam from the line of movement of an arm 81, which is carried at the outer end of a shaft 82, the opposite end of said shaft being provided with a swinging jaw 83, adapted to coöperate with the adjacent jaw 73, whereupon the spring 84 (see Fig. 21) throws jaw 83 down into engagement with the shank of the just-inserted bolt 61 and holds the same in the chuck-head. The turret just described forms the subject-matter of my pending application Serial No. 164,317. Thereupon the mutilated gear 85 comes into engagement with the gear 86. It is to be noted that the engaging surfaces of these two gears are equal, so that the shafts on which they are mounted revolve an equal number of times, although the shaft of the smaller gear is at rest the greater portion of the time. This permits of an equal number of operations while permitting the necessary pauses in the mechanism operating the turret.

Figures 22, 23:
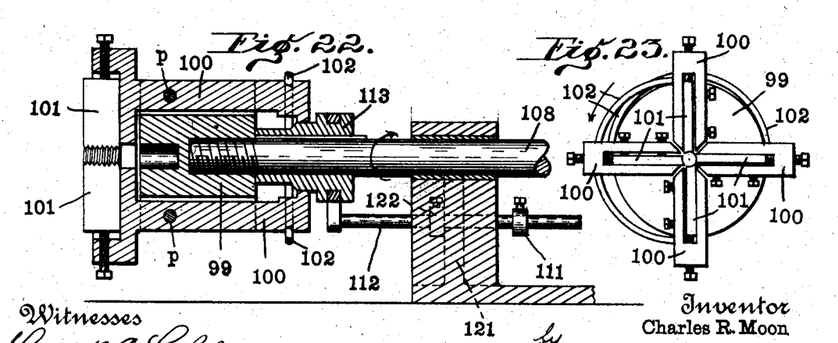
Fig. 22, an axial section, on an enlarged scale, of the die stock or head, similar to a portion of Fig. 2, but on an enlarged scale.
Fig. 23, an elevation of the face of said die-stock.
Figure 25:
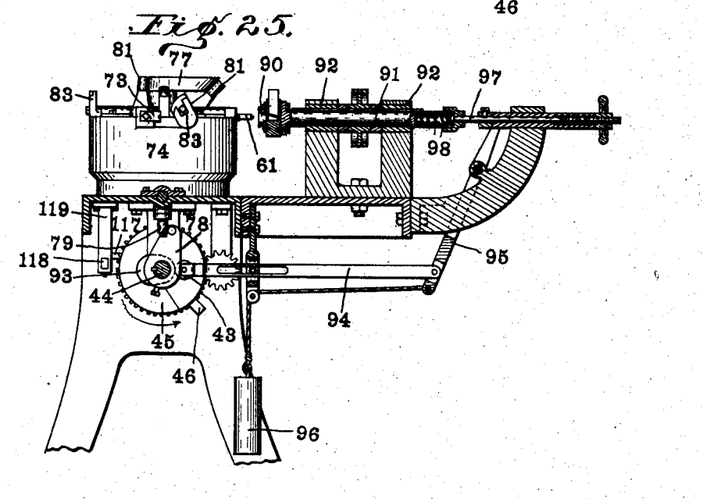
Fig. 25, a transverse sectional view as seen when looking in the direction indicated by the arrows from the dotted line 25 25 in Fig. 3.

The gear 86 is carried by shaft 87, which in turn carries a gear 88, meshing with a gear 89, forming part of the turret 74. The gear 89 is as many times greater in diameter than the gear 88 as there are holding-jaws in the chuck. A flange f, formed upon one side of the mutilated gear 85, having notches n near the ends of the toothed portion operating in conjunction with a detent d on the shaft 87 alongside the gear 86, secures said shaft and gear against rotation except during the period the gears are in engagement, and thus insures that the movements shall always be of the same character and that the relations of the moving parts shall be prevented from becoming altered. The result is (in the present case) that the turret 74 is rotated one-fourth of a revolution at each revolution of the shaft 87. This brings the set of bolt-holding jaws carrying the unthreaded bolt into alinement with a pointing-head 90, positioned at right angles with the shaft 87, and said pointing-head is continuously rotated upon a spindle 91, which is axially movable through suitable bearings 92, as is best shown in Fig. 25. As soon as this occurs a cam 93, carried by the main shaft 44, comes into engagement with a link 94, so as to swing arm 95 and drive the head 90 into engagement with the end of the alined bolt 61 and taper the end thereof, the head being then retracted by means of a suitable weight 96. The lever 95 engages a plunger 97, which acts upon spindle 91 by a suitable spring 98. During this time another bolt has been delivered by fingers 60 60' to the succeeding set of bolt-holding jaws of the turret, and the turret is then rotated another quarter of a revolution and a second bolt brought into alinement with the pointing-die, while the pointed bolt is brought into alinement with the die-head shown in Fig. 22.

The die-head 99 has pivoted thereto (on a pivot p) a plurality of die-carrying arms 100, each of which carries a portion of a die 101 in the usual manner, and the arms 100 are connected in pairs by springs 102, so as to be moved thereby to a position where the dies 101 are out of operative position. As soon as a pointed bolt is brought into alinement with the die-stock a cam 103, carried by shaft 44, comes into engagement with a sliding head 104, which head operates through a lever 105, plunger 106, and spring 107 to drive the spindle 108 forward and carry the die-stock therewith, forcing the dies into engagement with the alined bolt 61, and a thread is cut upon the bolt in the usual manner, spindle 108 being rotated continuously by means of a gear 109 meshing with gear 41. The throw of cam 103 is sufficient to cause the die to properly engage with the end of the bolt, and a continued threading movement of the die is produced against the action of weight 110 in the usual well-known manner, the length of thread being determined by a collar 111, carried by a rod 112, which is provided with a yoke engaging a head 113, keyed upon shaft 108 and provided with a cam adapted to be inserted between the ends of levers 100 and hold them in position to maintain the dies 101 in operative position.

Figure 26:
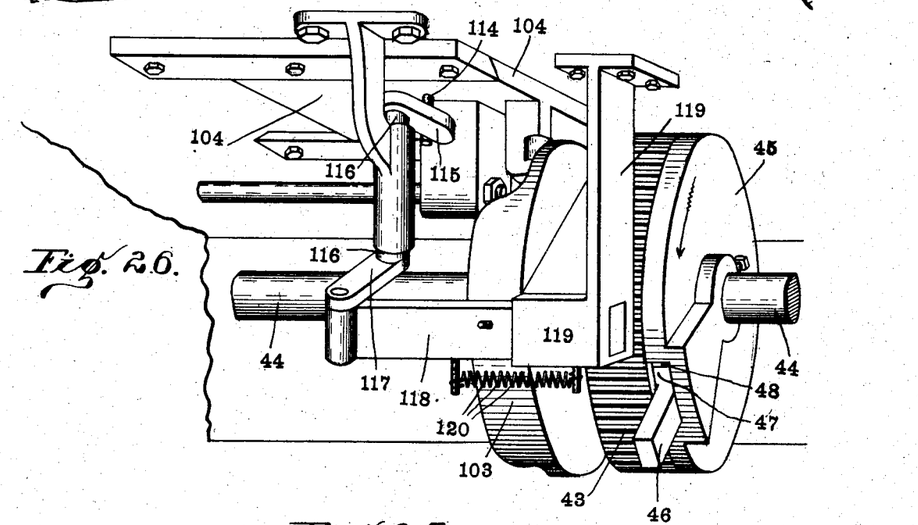
Fig. 26, a perspective detail of automatic means for preventing loss of time in case empty set of bolt-holding jaws is brought opposite the die-stock.
Figure 27:
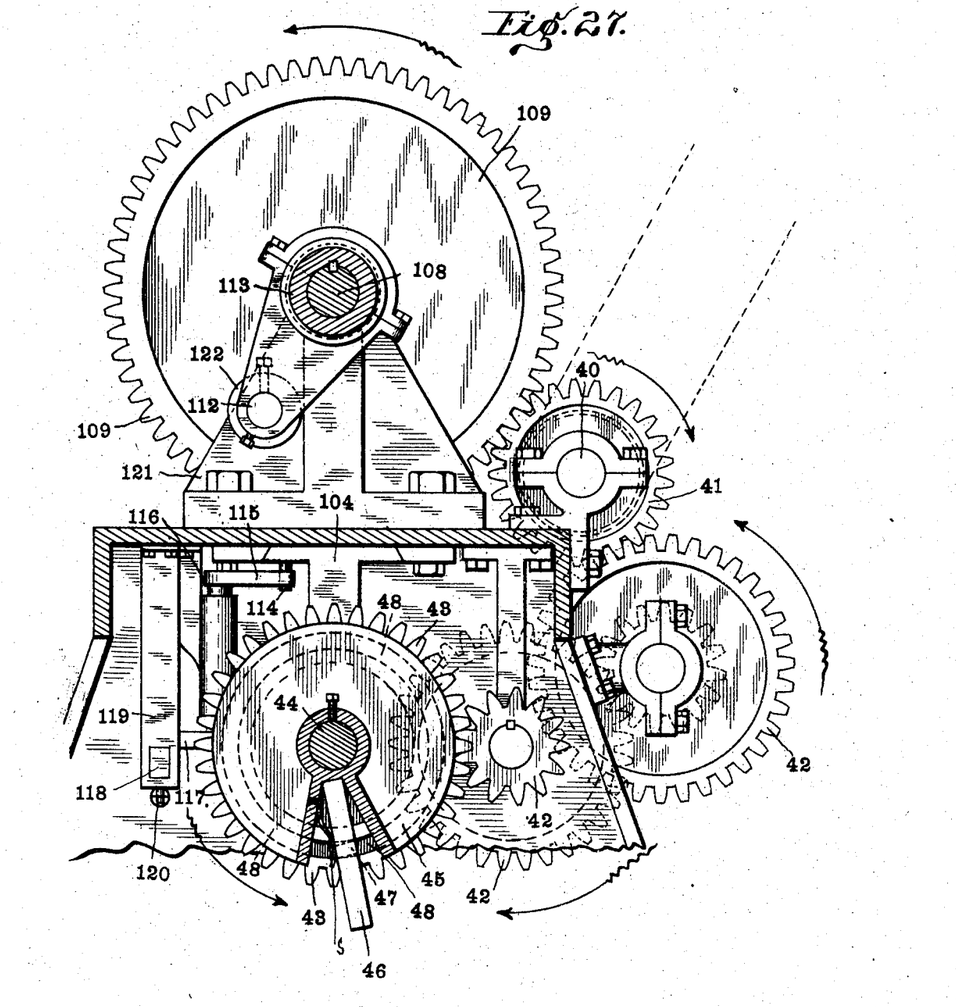
Fig. 27, a view, on an enlarged scale, of said automatic means and adjacent parts as seen when looking in the direction indicated by the arrows from the dotted lines 27 27 in Figs. 1 and 2.
Figure 28:
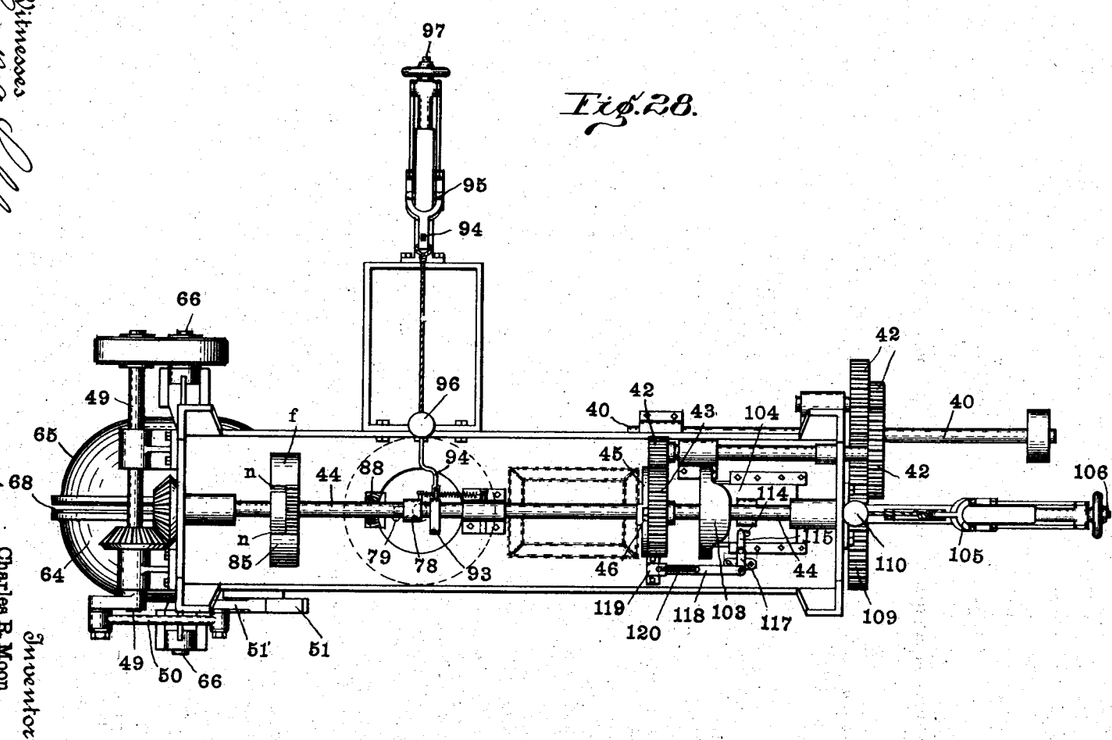
Fig. 28, an under side plan view of the machine.

As soon as slide 104 has been moved by cam 103 a pin 114, (see Fig. 26,) which is carried by said slide, is moved away from engagement with an arm 115, carried by a vertical shaft 116, said shaft carrying at its lower end an arm 117, pivoted to a slide 118, the end of which is slidably mounted in a suitable bracket 119. Thereupon the spring 120 serves to draw slide 118 through bracket 119 and project the end of said slide into the path of movement of finger 46, so that when the main shaft 44 rotates sufficiently the finger 46 is arrested by slide 118 and swung slightly with relation to disk 45, and thus disengaged from gear 43, so that said gear 43 may continue to rotate while shaft 44 is stopped.

Figure 1:
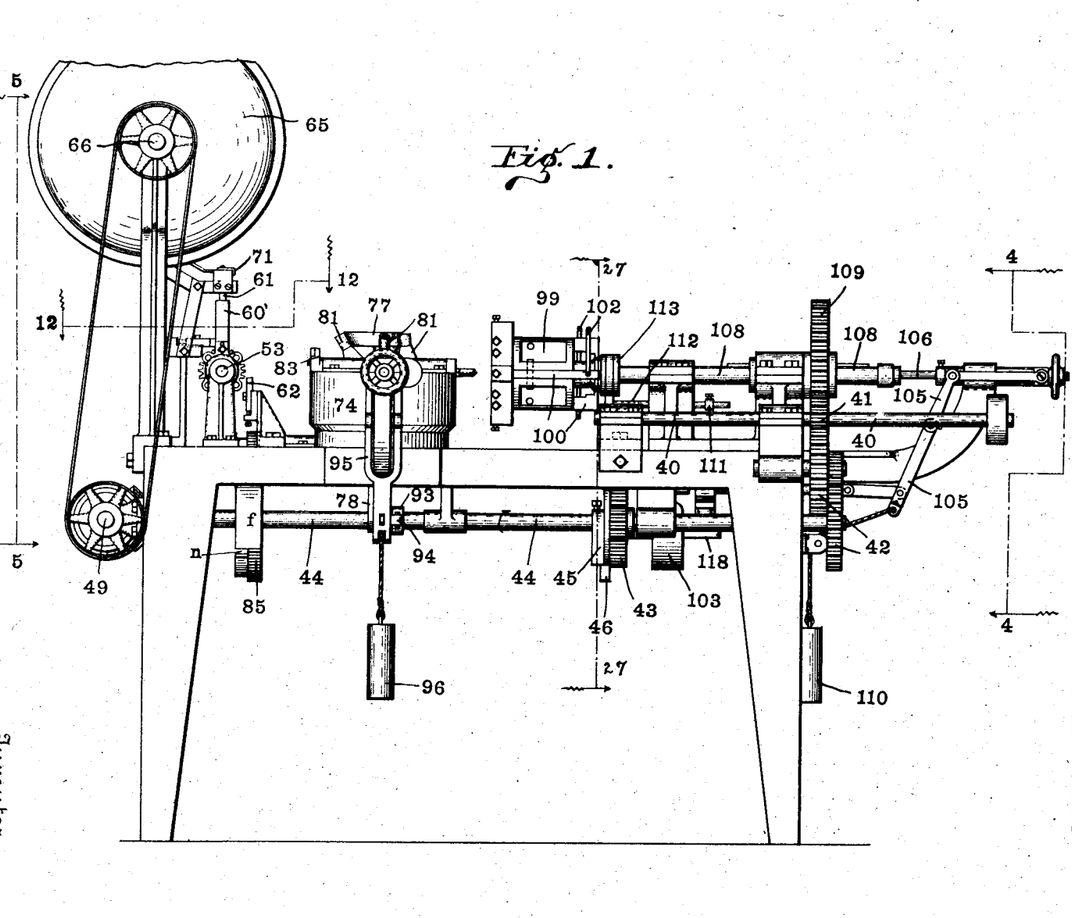
Figure 1 is a side elevation of a complete machine embodying my invention.
Figure 2:
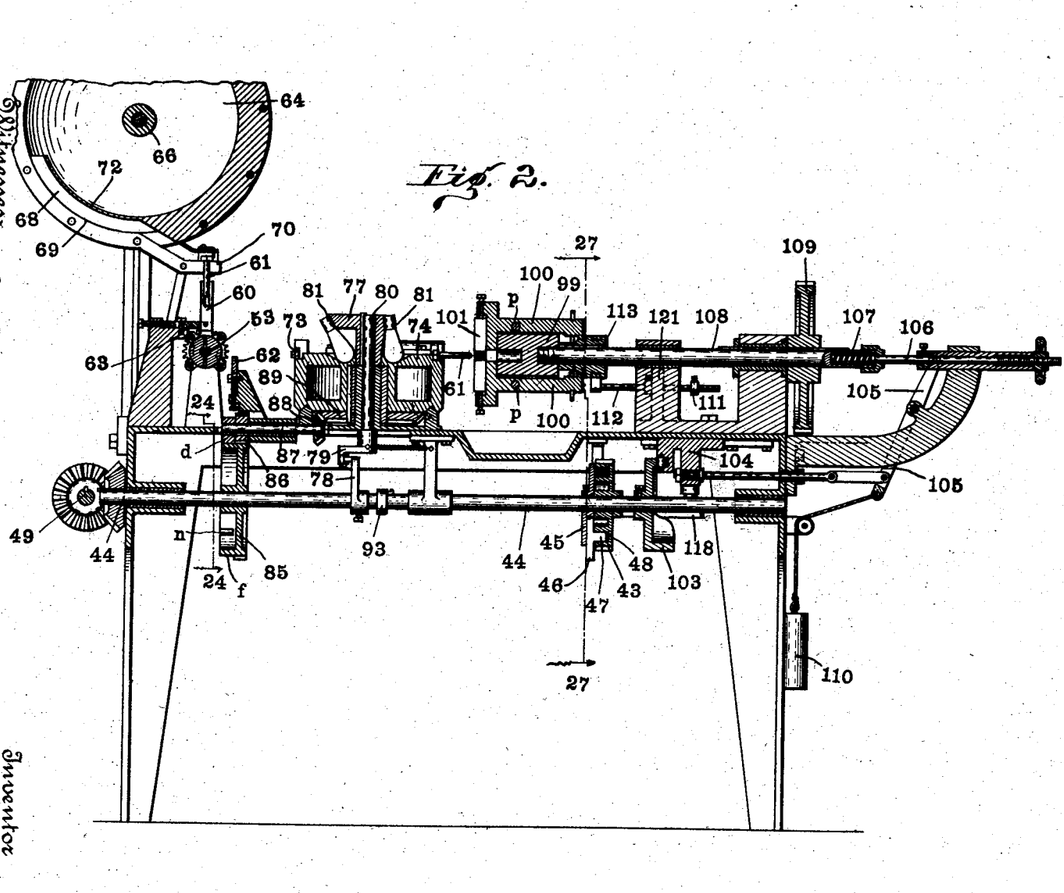
Fig. 2, a central vertical section taken at the point indicated by the dotted line 2 2 in Fig. 3.
Figures 3, 4, 24:
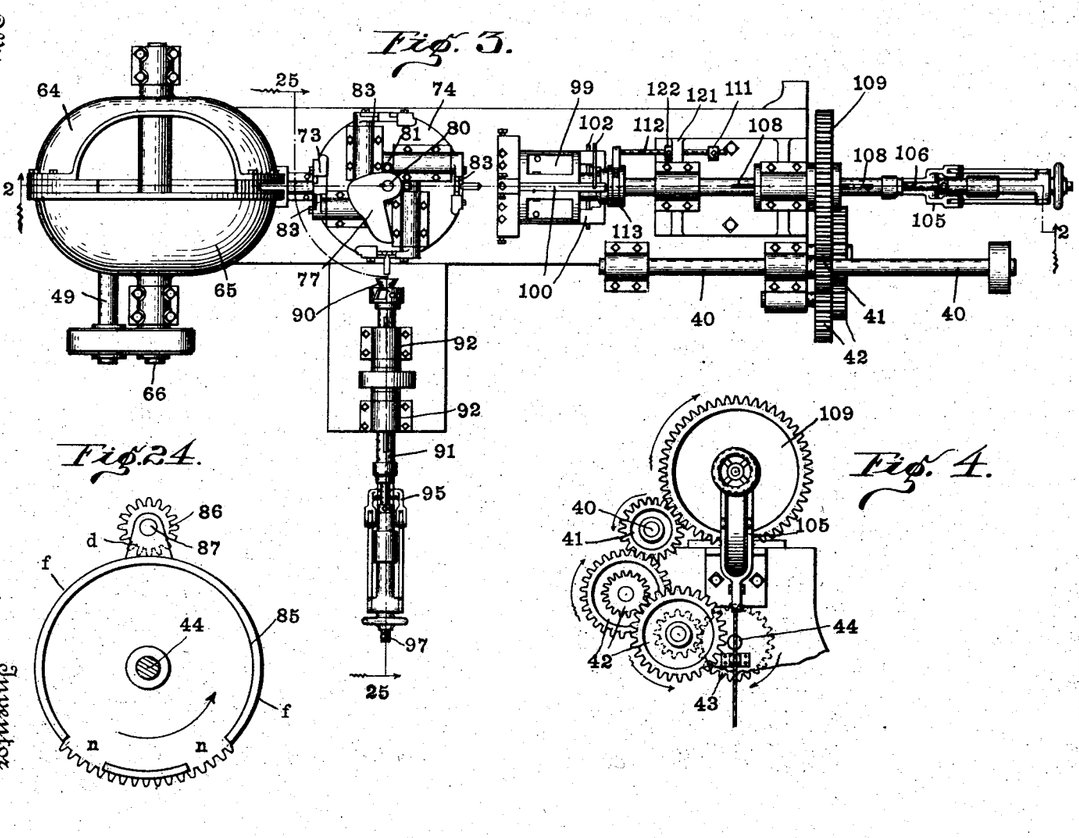
Fig. 3, a plan view.
Fig. 4, an elevation of the parts shown at the right-hand end of Figs. 1 and 3 as seen from the dotted line 4 4 alongside Fig. 1.
Fig. 24, a detail sectional view as seen when looking in the direction indicated by the arrows from the dotted line 24 24 in Fig. 2.
Figures 18, 19, 20, 21:
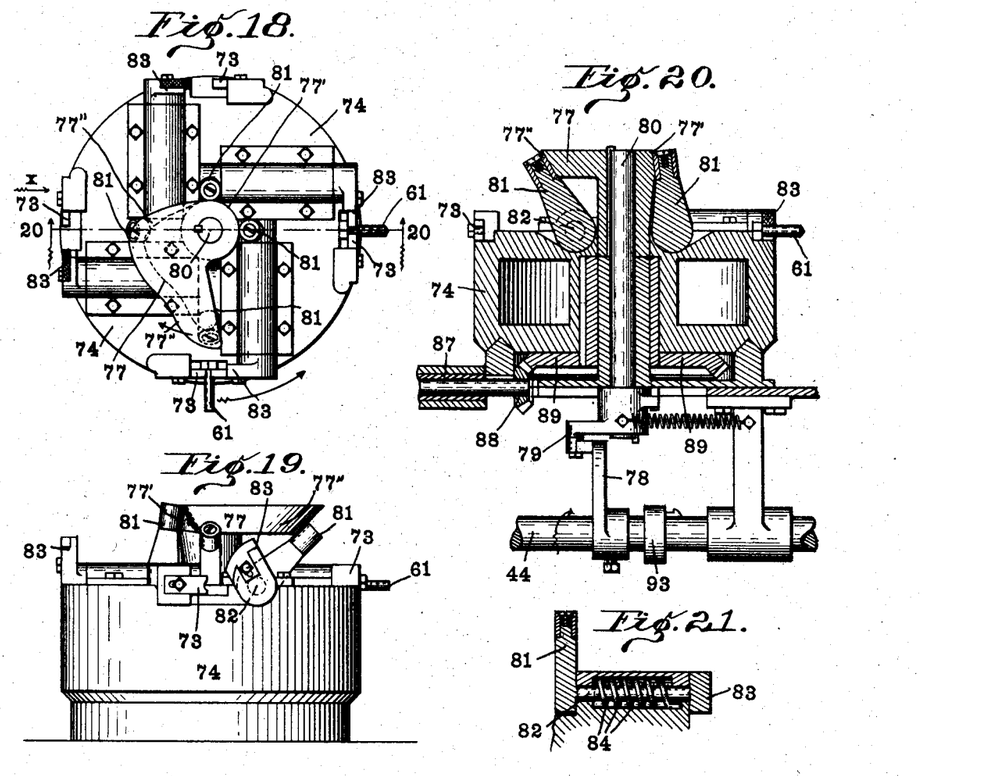
Fig. 18, a plan of the turret carrying the bolt-holding jaws, similar to a portion of Fig. 3, but on an enlarged scale.
Fig. 19, a side elevation thereof looking in the direction indicated by the arrow X in Fig. 18.
Fig. 20, a section on line 20 20 of Fig. 18.
Fig. 21, a sectional detail of one of the movable bolt-holding jaws.

When a sufficient amount of thread has been produced upon the bolt by the die-stock, the collar 111 comes into engagement with a stationary support 121, and the head 113 is thus withdrawn from the levers 100, so that the dies 101 are withdrawn from the bolt and the weight 110 serves to retract the parts from working position, this movement bringing a second collar, 122, (see Fig. 3,) which is carried by rod 112, into engagement with bracket 121 and again forcing head 113 between the levers 100, so as to return the dies 101 into operative alinement. The return of spindle 108 by weight 110 also returns slide 104 to normal position and brings pin 114 into engagement with arm 115, so as to retract slide 118, whereupon finger 46 by reason of either its own weight alone or aided by spring s will drop so as to cause finger 46 thereof to impinge upon the walls of slot 48 of gear 43, and thus set the main shaft 44 in operation again, whereupon the operations already described are repeated. If, however, by any chance there should have been no bolt 61 in alinement with the die-head, cam 103, which is short, will result in only a temporary projection of slide 118 into the path of finger 46 at a time when the finger 46 is some distance therefrom, so that said finger will not be arrested and the rotation of shaft 44 will be continued and the turret 74 operated sooner, so that no time will be lost. From the time a particular set of bolt-holding jaws has been filled from fingers 60 60' the arm 81 thereof remains in contact with a portion 77' of cam 77, which is concentric with the axis of rotation of chuck-head 74; but after the bolt 61 leaves the threading position the arm 81 of the movable jaw of the set holding said bolt comes into engagement with a portion 77'' of cam 77, which portions, as shown in Figs. 18, 19, and 20, operate to swing the corresponding jaw 83 away from the stationary jaw 73, and thus allow the threaded bolt to drop out.

The several operations are entirely automatic, so that an unskilled operator has merely to see that a sufficient quantity of bolts is kept in the hopper member 65. Of course the usual means for delivering a continuous stream of oil upon the die members should be provided; but all such apparatus has been omitted from the drawings for the sake of clearness.

Having thus fully described my said invention, what I claim as new, and desire to secure by Letters Patent, is—

1. The combination, in a bolt-threading machine, with the supply-hopper and the bolt holding and carrying turret, of transferring mechanism for carrying the bolt-blanks from the hopper to the turret, comprising a rock-shaft, a pair of gripping-fingers yieldingly mounted thereon, a cam also mounted on said shaft for automatically moving said fingers apart, means for causing a relative movement between said fingers and said cam, springs operating oppositely to the cam for forcing the fingers together, and mechanism for rocking said shaft.

2. The combination, in a bolt-threading machine, of a supply-hopper, a bolt holding and carrying turret, transferring-fingers for carrying the bolt-blanks from the hopper to the turret, a rock-shaft upon which said fingers are mounted, means for automatically separating said fingers axially of said shaft at the times of receiving and delivering the bolt-blanks, means for automatically closing said fingers during the period of transferring from the hopper to the turret, and means for automatically moving said fingers from adjacent the delivery-point of the hopper to adjacent the receiving-point of the turret.

3. The combination, in a bolt-threading machine, of a supply-hopper, a bolt holding and carrying turret, transferring-fingers for carrying the bolt-blanks from the hopper to the turret, disks shiftably mounted on a shaft for carrying said fingers and provided with cam-faces, a cam fixedly secured to the shaft between said disks and having corresponding cam-faces, means for automatically forcing said disks inwardly toward said cam, said shaft, stops at the ends of the path of travel of the fingers with which said fingers will come in contact, and means for imparting motion to said shaft arranged to continue such motion somewhat after the fingers are brought to rest by said stops, whereby the cam engagement is shifted automatically at the conclusion of the movement and the fingers thus automatically opened and closed.

4. The combination, in a bolt-threading machine, of a bolt-holding apparatus, a shaft from which the same is driven and carrying a clutch member fixedly mounted thereon, a gear loosely mounted on said shaft alongside said clutch member one face whereof forms the other clutch member, whereby when said clutch members are engaged said shaft is driven, bolt-threading devices, means connected with the bolt-threading devices whereby the clutch may be operated to disengage during the threading operation and operated to reëngage and thereby propel the shaft when the threading operation is concluded, thereby insuring a sufficient pause in the bolt-holding mechanism to permit the threading operation when a bolt is held therein while permitting the more speedy movement of said mechanism when empty.

5. The combination, in a bolt-threading machine, of the bolt-holding mechanism, a shaft whereby said mechanism is driven, a clutch whereby said shaft is normally connected to driving mechanism, bolt-threading mechanism wherein the cutting-head travels longitudinally of the machine and approaches and recedes from the bolt to be cut, a slide adjacent to the clutch, a connection between said slide and the bolt-threading mechanism whereby said slide is operated synchronously with the longitudinal movement of said bolt-threading mechanism, and means carried by said slide for disengaging the clutch during the period the threading operation is being performed.

6. In a bolt-threading machine, the combination, with the threading means and a bolt-holding turret, of a shaft for operating said turret, a driving-gear, an intermediate clutch between said gear and shaft consisting of a swinging radial pinching-lever 46 carried by one of said members and a coöperative annular flange carried by the other of said members, a reciprocating stop-arm arranged adjacent the path of movement of said lever, and means controlled by the relative change of axial position between the threading means and the turret for projecting and withdrawing said stop into and out of the path of movement of said lever, whereby the period of rest of the turret may be determined by the interaction of the threading means and turret.

7. In a bolt-threading machine, the combination, with the threading means and a bolt-holding turret, of a shaft for operating said turret, a driving-gear, an intermediate clutch between said gear and shaft consisting of a swinging radial pinching-lever 46 carried by one of said members and a coöperative annular flange carried by the other of said members, a reciprocating stop-arm arranged adjacent the path of movement of said lever, a cam operated by the shaft for bringing the threading means and turret into initial coöperative threading position, and means operated by said cam for shifting the stop-arm into and out of the path of movement of the lever.

8. In a bolt-threading machine, the combination, with a threading means and a bolt-holding means capable of relative movement toward and from each other, of means for automatically producing a portion of said movement sufficient to bring the threading means and a bolt into engagement when such bolt is present in the bolt-holding means but constructed to permit the completion of said movement by the action of the threading tool upon the bolt, and means tending to return the parts to normal upon the completion of said partial movement.

9. In a bolt-threading machine, the combination, with a threading means and a bolt-holding means capable of relative movement toward and from each other, of means for automatically producing a portion of said movement sufficient to bring the threading means and a bolt into engagement when such bolt is present in the bolt-holding means but constructed to permit the completion of said movement upon action of the threading-tool upon the bolt, means for immediately automatically returning the threading and holding means to normal when no bolt is presented by the bolt-holding means to the threading means, and means controlled by the relative movement between the threading means and bolt-holding means for preventing immediate action of the returning means upon engagement between the threading means and a bolt.

10. In a bolt-threading machine, the combination, with a threading means and a plurality of bolt-holding means for presenting bolts in succession to the threading means, which two means are capable of a certain relative movement toward and from each other, of means for automatically producing a portion of said movement sufficient to bring the threading means and a bolt into engagement when such bolt is present in the bolt-holding means but constructed to permit the completion of said movement by the action of the threading-tool upon the bolt, means for immediately automatically retracting said movement and for advancing the bolt-holding means to bring a succeeding bolt into alinement when no bolt is presented thereby to the threading means, and means controlled by such relative movement between the threading means and bolt-holding means for preventing immediate action of the said retracting and advancing means.

11. In a bolt-threading machine, the combination of a threading means, a bolt-holding means, means whereby the distance between said threading means and said bolt-holding means may be varied, means for effectuating a portion of the necessary movement sufficient only to bring the threading means and a bolt into engagement when such bolt is present in the bolt-holding means but constructed to permit the completion of said movement upon action of the threading-tool upon the bolt, and means acting to return the parts to normal when the bolt is not present.

12. In a bolt-threading machine, the combination of, a bolt-threading mechanism, a plurality of bolt-holding mechanisms for presenting bolts in succession to the threading mechanism, a shaft, means operated by said shaft for successively advancing the bolt-holding means into threading position, driving means for driving said shaft, means operated by said shaft for advancing the threading mechanism into engagement with the bolt, and means controlled by said advancement of the threading mechanism for disconnecting the driving means from the shaft when the threading means engages a bolt and for permitting the maintenance of said driving means when no bolt is presented.

13. In a bolt-threading machine, the combination of, a threading means, a turret having a plurality of sets of jaws for receiving and carrying bolt-blanks, a shaft, intermediate driving connections between said shaft and turret whereby said turret may be intermittently advanced, means operated by the shaft for causing a relative movement between the turret and threading mechanism to bring the threading mechanism into engagement with the bolt, a separable connection between said shaft and suitable driving means, and means controlled by the relative movement between the threading means and turret subsequent to engagement of the threading means with a bolt for separating said separable driving connection whereby the shaft will cease to rotate during the threading action, and means for retracing the relative movement between the threading means and turret, for the purpose set forth.

14. In a bolt-threading machine, the combination of, a threading means, a turret having a plurality of sets of jaws for receiving and carrying the bolt-blanks, a shaft, intermediate driving connections between said shaft and turret whereby said turret may be intermittently advanced, means operated by the shaft for moving the threading mechanism toward the turret an amount sufficient to cause engagement between the threading means and a bolt, means controlled by the subsequent movement of the threading means toward the turret for disconnecting the shaft from its driving means, and means for retracting the threading means from the turret.

In witness whereof I have hereunto set my hand and seal, at Indianapolis, Indiana, this 22d day of June, A. D. 1903.

CHARLES R. MOON. [L. S.]

Witnesses:
CHESTER BRADFORD,
JAMES A. WALSH.